(12) United States Patent
Fogwill et al.

(10) Patent No.: US 12,007,370 B2
(45) Date of Patent: Jun. 11, 2024

(54) REDUCING THERMAL GRADIENTS IN CHROMATOGRAPHY COLUMNS WITH SUB-AMBIENT COOLING/SUPER-AMBIENT HEATING AND RADIAL DISTRIBUTION

(71) Applicant: Waters Technologies Corporation, Milford, MA (US)

(72) Inventors: Michael O. Fogwill, Uxbridge, MA (US); Wade P. Leveille, Douglas, MA (US); Joseph D. Michienzi, Plainville, MA (US); Fabrice Gritti, Franklin, MA (US)

(73) Assignee: Waters Technologies Corporation, Milford, MA (US)

( * ) Notice: Subject to any disclaimer, the term of this patent is extended or adjusted under 35 U.S.C. 154(b) by 85 days.

(21) Appl. No.: 17/347,807

(22) Filed: Jun. 15, 2021

(65) Prior Publication Data

US 2021/0389284 A1 Dec. 16, 2021

Related U.S. Application Data

(60) Provisional application No. 63/039,231, filed on Jun. 15, 2020.

(51) Int. Cl.
*G01N 30/30* (2006.01)
*G01N 30/02* (2006.01)

(52) U.S. Cl.
CPC ....... *G01N 30/30* (2013.01); *G01N 2030/025* (2013.01); *G01N 2030/027* (2013.01);
(Continued)

(58) Field of Classification Search
CPC .............................................. G01N 2030/3046
See application file for complete search history.

(56) References Cited

U.S. PATENT DOCUMENTS

2012/0011921 A1* 1/2012 Broeckhoven ....... B01D 15/161
73/61.53
2013/0306558 A1 11/2013 Shalliker et al.
(Continued)

*Primary Examiner* — Jamel E Williams
*Assistant Examiner* — Alex T Devito
(74) *Attorney, Agent, or Firm* — Goodwin Procter LLP

(57) ABSTRACT

Exemplary embodiments may compensate for expected frictional heating or Joule-Thomson cooling in chromatography columns. Frictional heating or Joule Thomson cooling are the same thing for a fluid decompressing along a porous material. Either heat is absorbed from or released to the external environment. The exemplary embodiments may cool the mobile phase to a sub-ambient temperature before the mobile phase passes through a chromatography column to compensate for the frictional heating or heat the mobile phase to a super-ambient temperature to compensate for Joule-Thomson cooling. The amount of temperature increase expected from the frictional heating or the amount of temperature decrease expected from the Joule-Thomson cooling may be calculated or estimated. Based on the amount of temperature increase or decrease expected, the set point for the heater/cooler may be determined and applied to the mobile phase. The analyte may be injected solely into a central portion of the chromatography column to further compensate for thermal gradients.

13 Claims, 10 Drawing Sheets

(52) U.S. Cl.
CPC .............. *G01N 2030/3015* (2013.01); *G01N 2030/3046* (2013.01)

(56) References Cited

U.S. PATENT DOCUMENTS

2013/0313197 A1   11/2013  Ritchie et al.
2015/0157959 A1*  6/2015  Bouvier ................ G01N 30/54
                                                          210/656

* cited by examiner

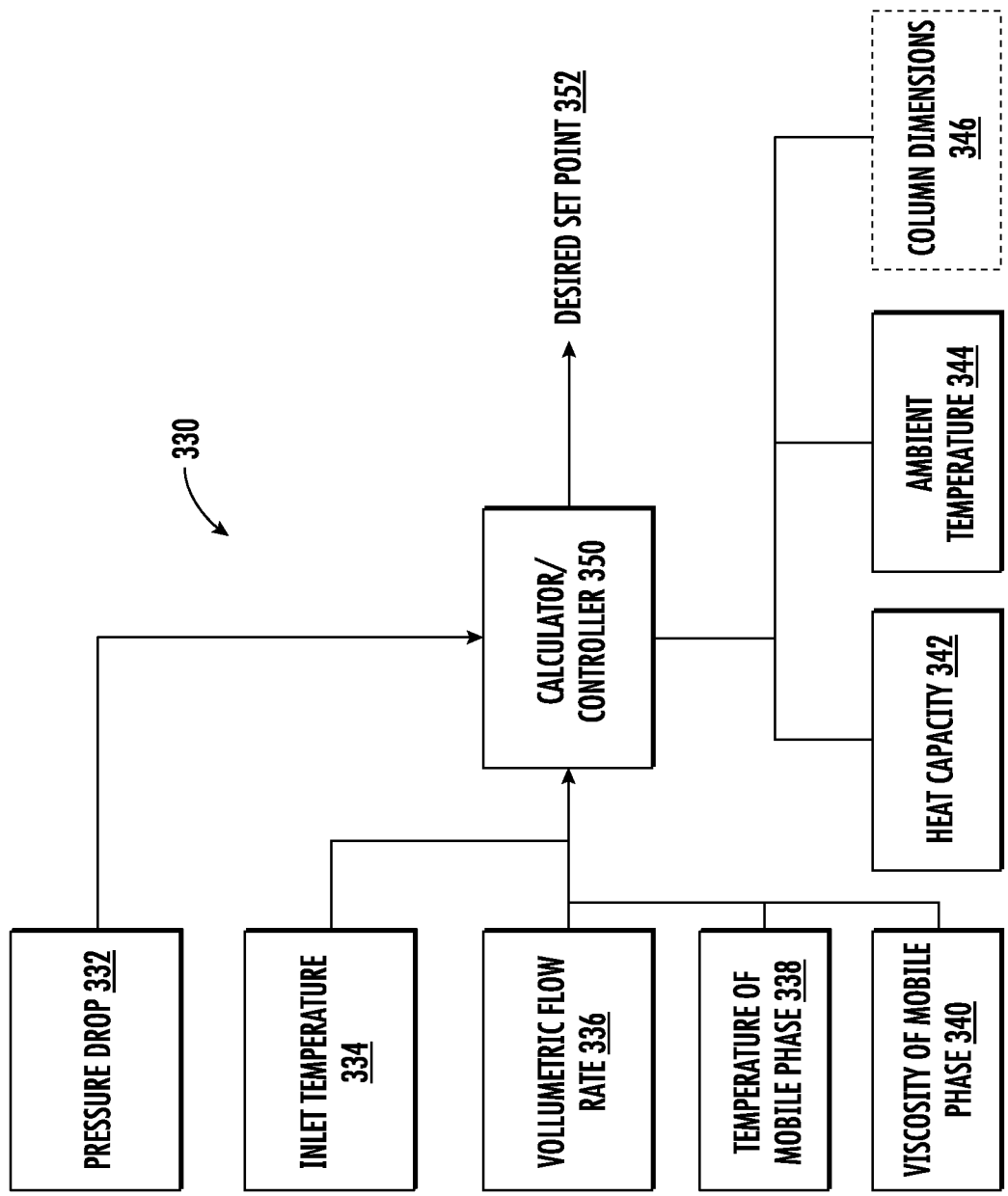

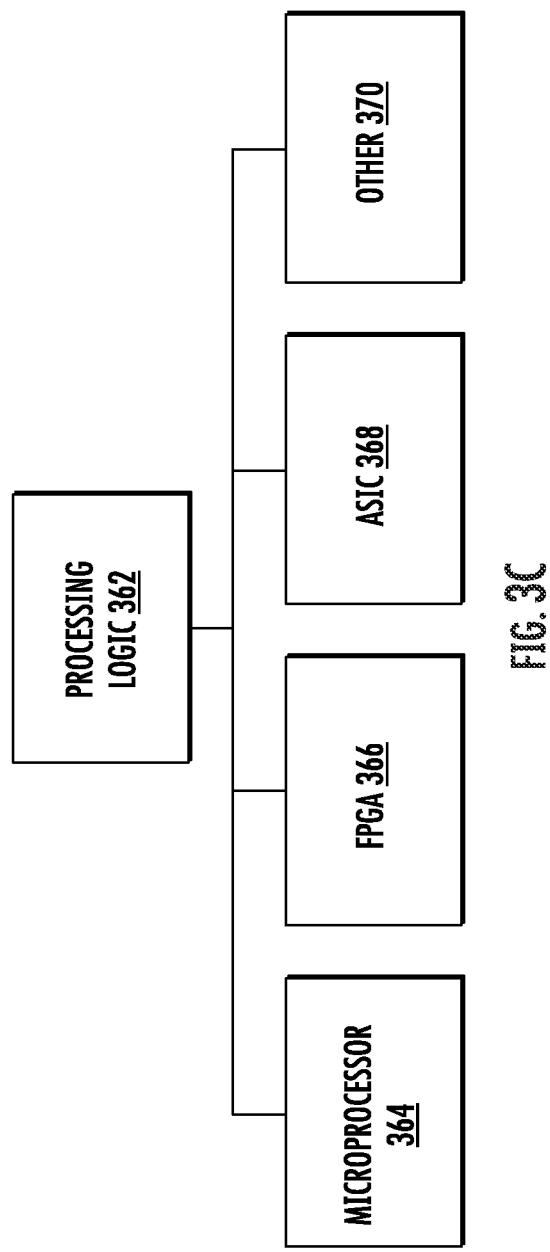

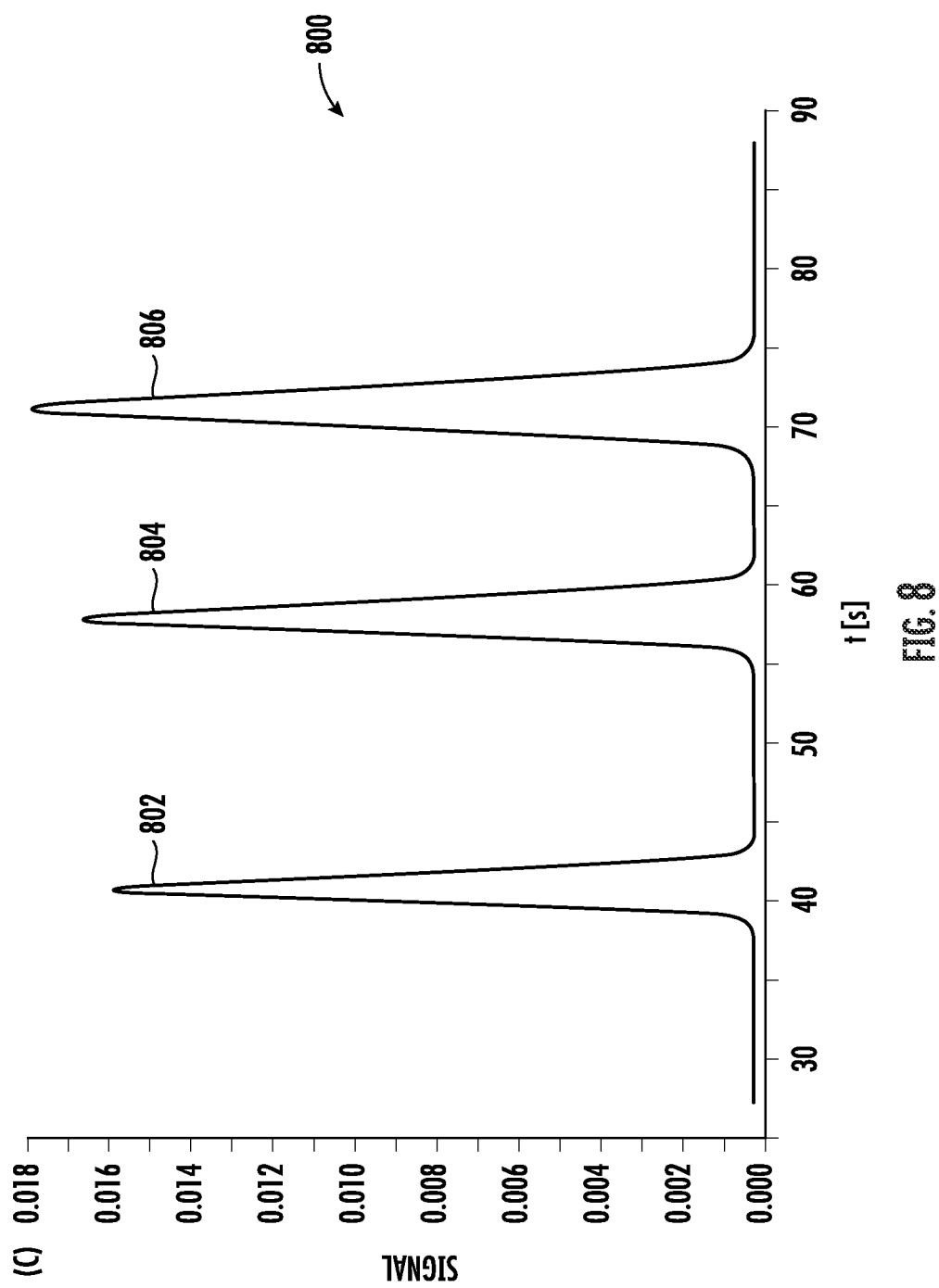

REDUCING THERMAL GRADIENTS IN CHROMATOGRAPHY COLUMNS WITH SUB-AMBIENT COOLING/SUPER-AMBIENT HEATING AND RADIAL DISTRIBUTION

CROSS-REFERENCE TO RELATED APPLICATIONS

This application claims the benefit of and priority to U.S. Provisional Patent Application No. 63/039,231, filed on Jun. 15, 2020, the entire contents of which are hereby incorporated by reference.

BACKGROUND

Thermal management of a chromatography column may be challenging. For instance, a radial thermal gradient can form in a chromatography column where the mobile phase flowing through the center of the chromatography column is of a different temperature than the mobile phase flowing through the outer radial portion of the chromatography column or where the temperature of the mobile phase entering the column is cooler/hotter than that of the oven/surrounding environment. When both flow rate and pressure drop are too large, frictional heating of the mobile phase passing through the column over the stationary phase occurs. Coupled with radial heat dissipation allowed when the column is not placed under strict adiabatic conditions, this produces a discrepancy in radial temperatures. In other cases, such as with supercritical fluid chromatography (SFC), the center of the column is cooler than the radial portion of the column due to Joule-Thompson cooling. Frictional heating or Joule Thomson cooling are the same thing for a fluid decompressing along a porous material. Either heat is absorbed from or released to the external environment. Such a radial thermal gradient may induce chromatographic band broadening and diminish the performance of the chromatographic system.

One approach to avoid the problem of radial thermal gradients is to place the chromatography column in a column oven for matching the column wall temperature from inlet to outlet. FIG. 1 depicts an example of a conventional system 100 that adopts this approach to address frictional heating or Joule Thomson cooling. In this system 100, a pre-heater 102 pre-heats the mobile phase with the sample 101 before entering the chromatography column 104 and exiting to a detector 108. The aim is to heat the chromatography column 104 to a target temperature. The column oven 106 attempts to keep the exterior temperature of the chromatography column 104 at the same temperature as the interior of the chromatography column 104. This helps to reduce the thermal flux through walls of the chromatography column 104 and thus, helps to reduce thermal gradients. However, for chromatography columns with higher pressure drops (like, for example, ultra-performance liquid chromatography (UPLC) columns or high performance liquid chromatography (HPLC) columns) viscous frictional heating of the mobile phase results in increased interior column temperatures and thermal gradients.

FIG. 2 depicts an illustrative chromatogram 200, based on a chromatogram from J. Kostka et al., *J. Chromatogr. A*, 1217 (2010) 4704, where the peaks 204, 206 and 208 have broadened at their bases to due thermal gradients. For example, base 202 of peak 204 is much broader due to thermal gradients than it would be if the chromatography column did not have thermal gradients. In addition, the peaks are distorted in shape due to the tailing resulting from the thermal gradients.

SUMMARY

In accordance with an exemplary embodiment, a chromatography system includes a chromatography column having an inlet, an outlet and a stationary phase situated in the column. The system also includes a cooler situated before the inlet of the column for cooling a mobile phase before the mobile phase enters the chromatography column and a controller for controlling the cooler so that the cooler cools the mobile phase to a temperature colder than an ambient temperature surrounding to compensate for thermal heating due to friction as the mobile phase passes over the stationary phase.

The system may also include an injector for injecting an analyte in a centrally located portion of the inlet but not in outer radial portions of the inlet. The injector may be configured for injecting the mobile phase without the analyte in the outer radial portions of the inlet. The injector may include injector ports radially distributed across the inlet of the chromatography column. The mobile phase may be one of a gas, a liquid or a fluid. The system may include processing logic for estimating how much heat is added to the mobile phase by friction between the inlet and the outlet and calculating a set point for the cooler based on the estimating. The estimating may be based on one or more of flow rate, viscosity of the mobile phase, heat capacity of the mobile phase and the chromatography column, current ambient temperature, temperature of the mobile phase prior to cooling, pressure delta or dimensions of the chromatography column. The chromatography column may not be insulated or may have insulation for insulating at least a portion of the chromatography column is some embodiments.

In accordance with an exemplary embodiment, a chromatography system includes a chromatography column having an inlet, an outlet and a stationary phase situated in the column. The system may also include a heater situated before the inlet of the column for heating a mobile phase before the mobile phase enters the chromatography column and a controller for controlling the heater so that the heater heats the mobile phase to a temperature warmer than an ambient temperature surrounding to compensate for Joule-Thomson cooling as the mobile phase passes over the stationary phase.

The system may further include an injector for injecting an analyte in a centrally located portion of the inlet but not in outer radial portions of the inlet. The injector may be configured for injecting the mobile phase without the analyte in the outer radial portions of the inlet. The injector may include injector ports radially distributed across the inlet of the chromatography column. The mobile phase may be one of a gas, a liquid or a fluid. The system may include processing logic for estimating how much cooling of the mobile phase occurs between the inlet and the outlet due to Joule-Thomson cooling and calculating a set point for the heating element based on the estimating. The estimating may be based on one or more of flow rate, viscosity of the mobile phase, heat capacity of the mobile phase and the chromatography column, current ambient temperature, temperature of the mobile phase prior to cooling, pressure delta or dimensions of the chromatography column. the chromatography column may not be insulated or may include insulation for insulating at least a portion of the chromatography column.

In accordance with an exemplary embodiment, a method is performed. Per this method, an amount of heating due to friction or cooling due to Joule Thomson cooling experienced by a mobile phase as the mobile phase flows over a stationary phase in a chromatography column from inlet to outlet of the chromatography column is estimated with processing logic. A set point for a heater or cooler is estimated to compensate for the heating due to friction or cooling due to Joule Thomson cooling based on the estimating. The determined set point is applied to the heater or cooler positioned before the inlet of the chromatography column, wherein the heater heats or the cooler cools the mobile phase. The method may include injecting an analyte only at a centrally located portion of the inlet of the chromatography column.

BRIEF DESCRIPTION OF THE DRAWINGS

FIG. 3B depicts possible inputs to a controller for establishing a desired temperature set point.

FIG. 3C illustrates different types of processing logic that may be used in exemplary embodiments.

FIG. 8 depicts an illustrative chromatogram with no peak broadening or tailing.

DETAILED DESCRIPTION

Exemplary embodiments may compensate for expected frictional heating or Joule-Thomson heating in chromatography columns. The exemplary embodiments may cool the mobile phase to a sub-ambient temperature before the mobile phase passes through a chromatography column to compensate for the frictional heating. The amount of temperature increase expected from the frictional the heating may be calculated or estimated. Based on the amount of temperature increase expected, the set point for the heater may be determined and applied to the mobile phase.

Conversely, the exemplary embodiments may heat the mobile phase to a super-ambient temperature before the mobile phase passes through a chromatography column to compensate for Joule-Thomson cooling. The amount of temperature decrease expected from the Joule-Thomson cooling may be calculated or estimated. Based on the amount of temperature decrease expected from the Joule-Thomson cooling, the set point for the cooler may be determined and applied to the mobile phase.

Such pre-heating or pre-cooling helps to diminish thermal gradients in the chromatography column. Further diminishment may be achieved by controlling the radial location where the sample of analyte is injected and where the mobile phase (e.g., solvents) is injected. In some exemplary embodiments, the sample in injected via injector ports that are centrally located at the inlet or in longitudinal proximity to the inlet of the chromatography column. The solvents of the mobile phase are injected via injector ports located at radially outward locations in the chromatography column. The injection of the sample centrally causes the sample to be subject to the friction or Joule-Thomson cooling so that a more predictable temperature for the sample is obtained and thermal gradients are diminished.

The chromatography columns of the exemplary embodiments may be liquid chromatography columns or supercritical fluid columns. The columns may be packed columns, open tubular columns, or packed capillary column. Radial gradients seem to be especially of interest to packed columns approx. 1 mm internal diameter and above. The chromatography columns may be gas chromatography columns, but thermal gradients typically are less of an issue for gas chromatography columns.

The exemplary embodiments may provide for diminished thermal gradients without the need for column ovens or insulated jackets, such as vacuum insulated jackets, for the chromatography columns.

Figure 1:
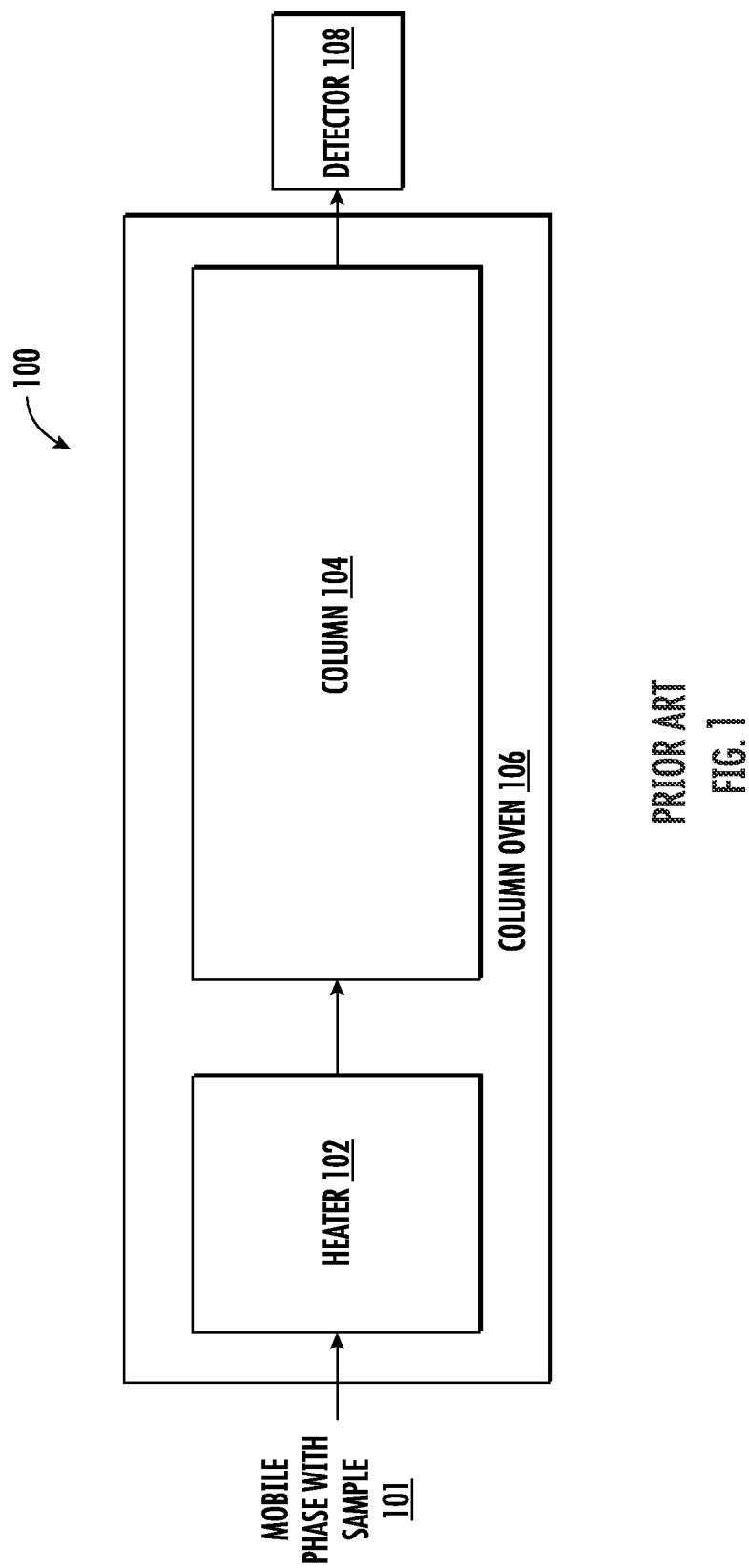
FIG. 1 depicts a conventional liquid chromatography system.
Figure 2:
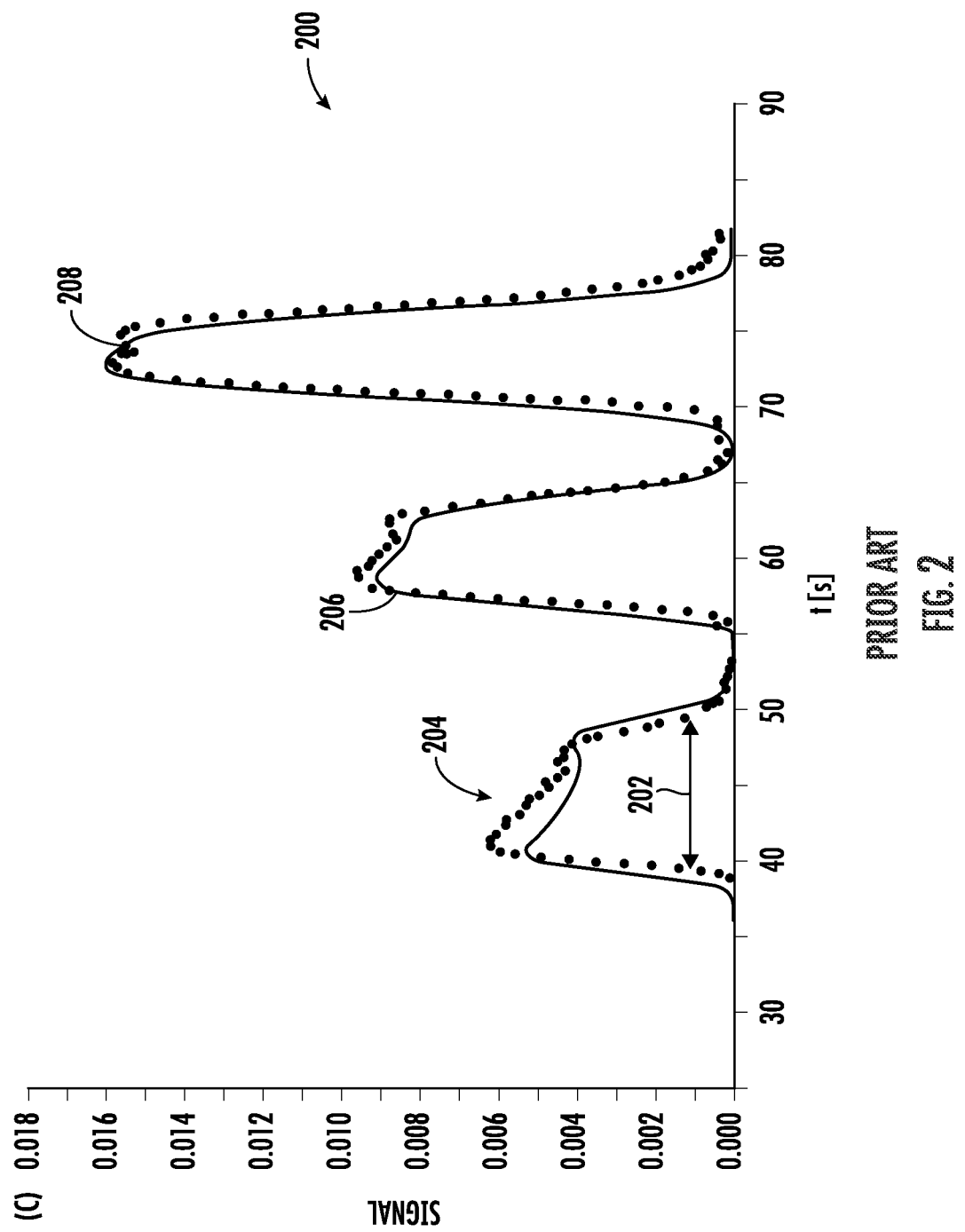
FIG. 2 depicts a chromatogram with base broadening and tailing due to thermal gradients.
Figure 3A:
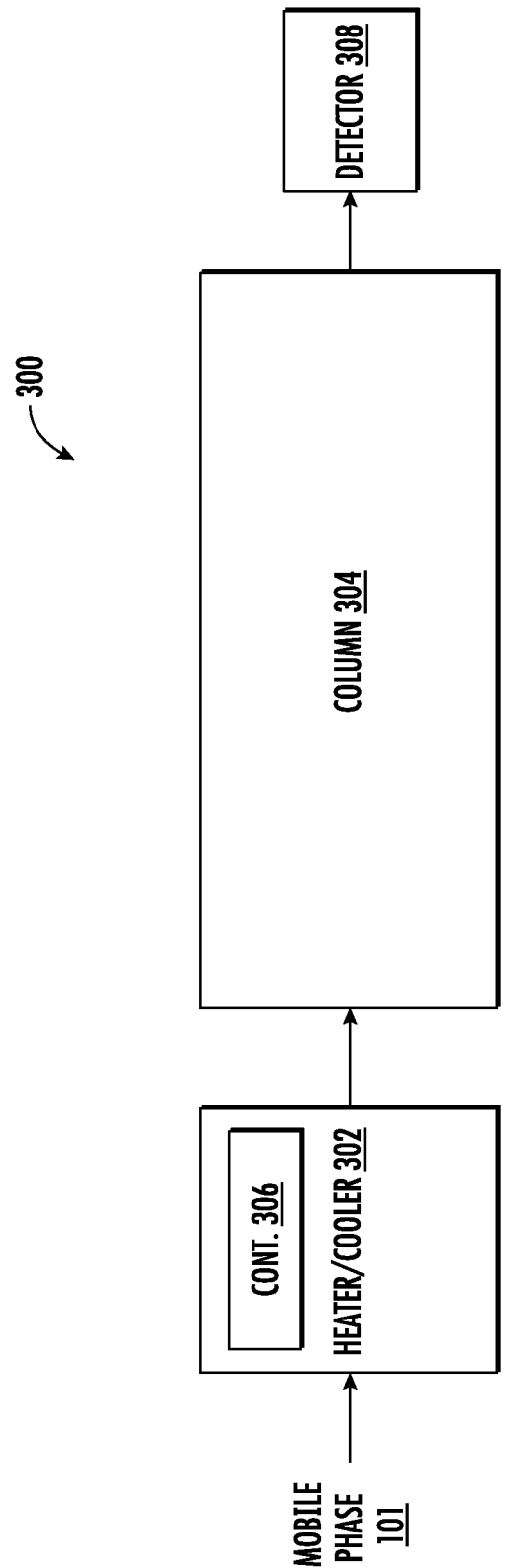
FIG. 3A depicts an illustrative chromatography system for an exemplary embodiment.

FIG. 3A depicts a block diagram of a chromatography system 300 that is suitable for an exemplary embodiment. The chromatography system 300 includes a heater or cooler 302 for heating or cooling the mobile phase 301 prior to the chromatography column 304. The heater imparts heat to the mobile phase, and the cooler imparts cold to the mobile phase 301. The heater/cooler 302 has a controller 306 for regulating how much heat or cold is applied to the mobile phase 301. The mobile phase flows through the chromatography column 304 over a stationary phase contained therein and elutes out of the chromatography column 304, where the analyte is detected by a detector 308.

The controller 306 may establish a temperature set point for the heater/cooler 302. The heater/cooler 303 will attempt to heat or cool the mobile phase to the temperature set point. The controller 306 may in some instance send a control signal to the heater/cooler 303 to establish the temperature set point. In other instances, electrical circuitry may be used to establish the temperature set point.

In order to establish the desired temperature set point 352 (FIG. 3B), a calculator/controller 350 may need to estimate the amount of heating or cooling that is caused by the frictional heating or Joule-Thomson cooling. As shown in FIG. 3B, a number of different values may be used to estimate the temperature change expected for the mobile phase due to frictional heating or Joule-Thomson cooling. These values may include the pressure drop 332 across the chromatography column or system. The temperature at or near the inlet 334 may be used. The volumetric flow rate 336 along the column or of a pump may be used. The temperature of the mobile phase 338 before heating or cooling may be used. The viscosity of the mobile phase 340 may be of interest. The heat capacity of the column and/or mobile phase 342 may be of interest. The ambient temperature 344 may be used, and in some instances, column dimensions, like diameter and length may be of interest as is discussed in more detail below.

The calculator/controller 350 may include processing logic 362 (FIG. 3C) for determining the temperature set point. The processing logic 362 may include different types of components that may be used alone or in conjunction with others of the components. For example, the processing logic 362 may be a microprocessor 364 that executes computer-executable instructions to determine the temperature set point. The processing logic 362 may include a field programmable gate array (FPGA) 366 or an application specific integrated circuit (ASIC) 368. The processing logic 362 may include electrical circuitry or include remote resources, such as cloud-based computing resources.

Figure 4:
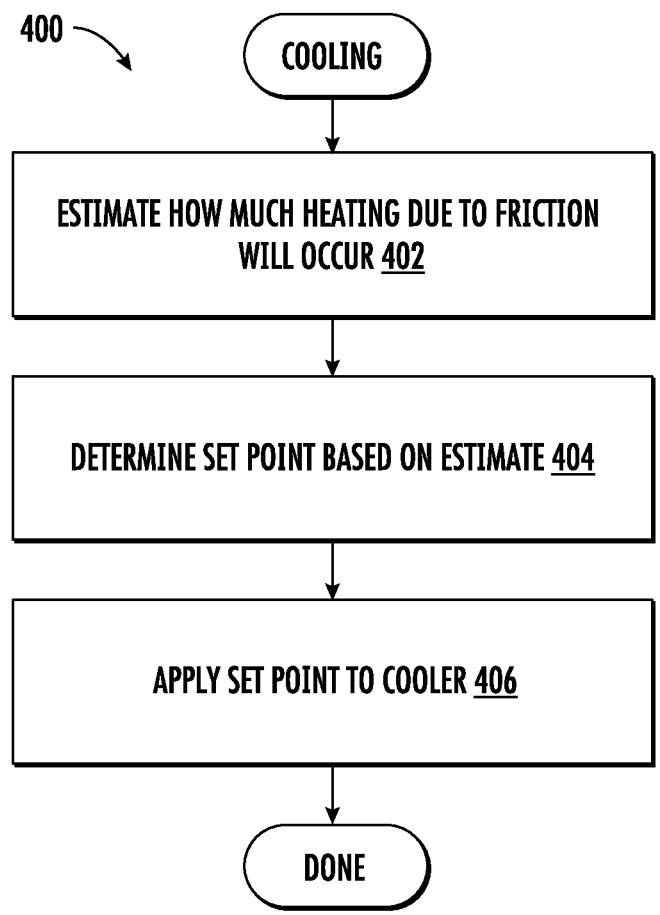
FIG. 4 depicts a flowchart of illustrative steps that may be performed to compensate for frictional heating.

FIG. 4 depicts a flowchart 400 of illustrative steps that may be performed in an exemplary embodiment to compensate for frictional heating by applying cooling. Initially, it is estimated how much heating due to frictional heating will occur in the chromatography column (402). Heat power released for heating of the mobile phase may be expressed as $(1+\alpha T)\Delta P \times Fv$ in Watt units. The estimate may be calculated in a number of different other ways. An empirically derived estimate may be used in exemplary embodiments based on known and available information.

The exemplary embodiments may determine the temperature set point for the heater based on available information without requiring user input or requiring only minimal user input. For example, the estimate may be calculated based on the temperature delta expressed in equation 1 below. To compensate for heating, the controller may set the temperature input for the heater to the current ambient temperature plus the expected temperature change such as laid out in the discussion of Equations 1-3 below. exemplary embodiments may estimate the temperature set point of the heater based on available information, such as pressure delta along the column, temperature at the inlet of the chromatography column and volumetric flow rate. In some instances, the estimate may be normalized for column dimensions, such as length and diameter. The estimate is not computationally burdensome and can be recalculated as the chromatography column is in use.

The exemplary embodiments recognize that the difference between the temperature at the column outlet and the temperature at the column inlet is proportional to the volumetric flow rate multiplied by the pressure drop. This can be expressed in a relationship as:

$$T_{out} - T_{in} \cdot Fv \times \Delta P \quad \text{(Equation 1)}$$

where $T_{out}$ is the ambient temperature surrounding the outlet of the column, $T_{in}$ is the ambient temperature surrounding the inlet of the column before heating, Fv is the volumetric flow rate and $\Delta P$ is the pressure drop along the column.

In another exemplary embodiment, the difference between the temperature at the column outlet and the temperature at the column inlet is proportional to the volumetric flow rate multiplied by the pressure drop multiplied by the column length.

There is a linear relationship, which can be expressed as:

$$\ln(Fv \times \Delta P) = 0.0957(T_{out} - T_{in}) + 5.443 \quad \text{(Equation 2)}$$

for a 2.1×100 mm column packed with 1.6 μm particles across various MP compositions, volumetric flow rates and inlet temperatures. An empirically derived offset of 5.443 and an adjustment factor are included. Using equation 3 and solving for $T_{out}$ results in:

$$T_{out} = (\ln(Fv \times \Delta P) - 5.443)/0.0957 + T_{in}. \quad \text{(Equation 3)}$$

Equation 3 may be used to generate the estimate of the desired temperature set point for the heater in exemplary embodiments. Knowing the value of $T_{out}$ enables one to determine the temperature delta between inlet and outlet and thus how much of a temperature increase needs to be compensated for.

The flow rate Fv may be chosen as the volumetric flow rate of the mobile phase through the column or the flow setting for a pump in the system. The pressure delta $\Delta P$ may be chosen as the pressure delta along the column or through the system.

In some embodiments, it may be desirable to normalize the equation for column dimensions that differ from the dimensions used in the above case that was used to derive Equation 3. Thus, the column dimensions may be used as input to the calculator/controller as well. To account for different length columns, Equation 3 may need to be divided by a normalizing factor proportional to the length.

Next, the set point for the heater is determined (404). This may be set as the current mobile phase temperature plus the estimate of the amount of heat that is added by friction. The temperature set point may then be applied to the heater 302 by the controller 306 (406).

Figure 5:
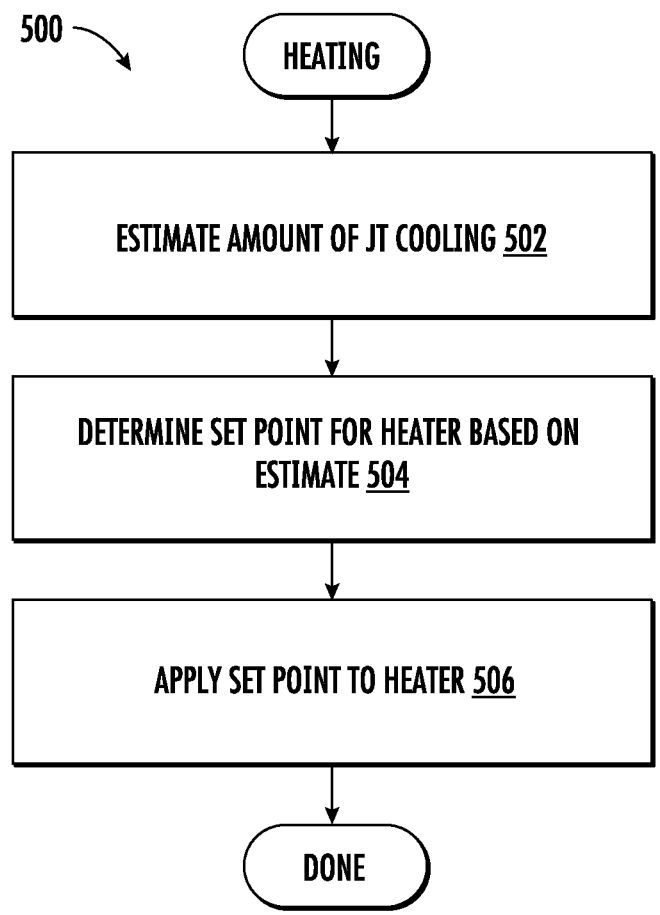
FIG. 5 depicts a flowchart of illustrative steps that may be performed to compensate for Joule-Thomson cooling.

FIG. 5 depicts a flowchart 500 of illustrative steps that may be performed to provide compensate for Joule-Thomson cooling. Initially, an estimate of the amount of Joule Thomson cooling is determined (502). Heat power absorbed by the mobile phase is $(1+\Delta T)\Delta P \times Fv$ in Watt units. A temperature set point is determined to compensate for the Joule-Thomson cooling (504). This temperature set point sets to cool the mobile phase roughly equal to the amount of cooling expected to occur in the chromatography column. The temperature set point is then applied to the cooler 302 (FIG. 3A) by the controller 306 (506).

Figure 6:
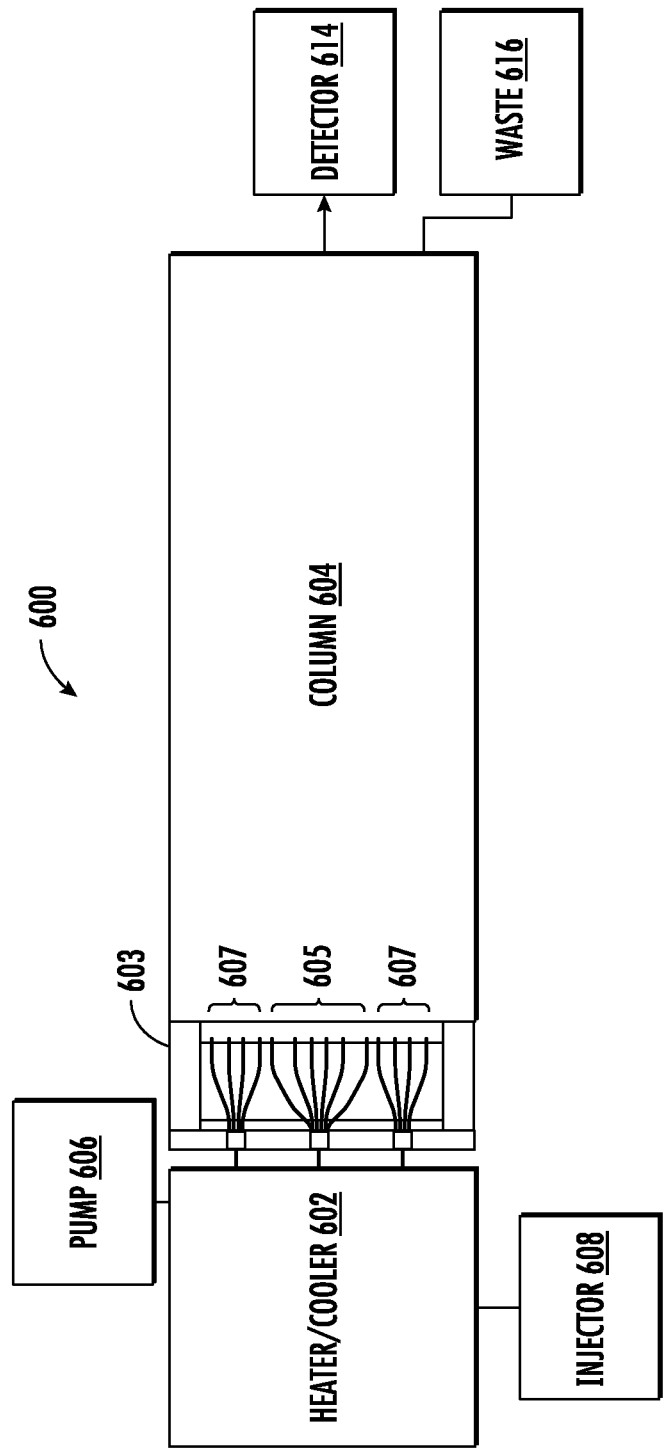
FIG. 6 depicts a block diagram of a chromatography system deploying a heater/cooler and radially dispersed injector ports.

As was described above, another option to help decrease thermal gradients in chromatography columns is to use an injector that injects the sample of analyte centrally in the column (i.e., in central radial location at or longitudinally near the inlet of the chromatography column). FIG. 6 depicts an illustrative chromatography system 600 that includes such an injector arrangement. The chromatography system 600 includes heater/cooler 602 for heating or cooling the mobile phase. A pump 606 provides solvent(s) for the mobile phase. An injector 608 provides samples of analyte. The injector array 603 includes radially distributed injector ports. There are radially centrally located injector ports 605 and radially outward located injector ports 607. The radial centrally located injector ports 605 inject the samples of analyte from the injector 608 into the central core of the chromatography column 604, whereas the radially outward located injector ports inject the solvents from the pump 606. A similar ejector apparatus may be located near the outlet of the chromatography column 604 so that the analyte is centrally received and passed on to the detector 614 and the mobile phase is radially outwardly received and passed to waste 616.

In this approach of FIG. 6, the analyte does not reach the outside of the inlet of the chromatography column 604 where a radial thermal gradient exists. The outlet of the column is well matched to the surrounding ambient temperature so that there is no radial thermal gradient. Therefore, as the analyte diffuses out radially through the chromatography column 604, the analyte only occupies the conical region within the column unaffected by radial thermal gradients.

Figure 7:
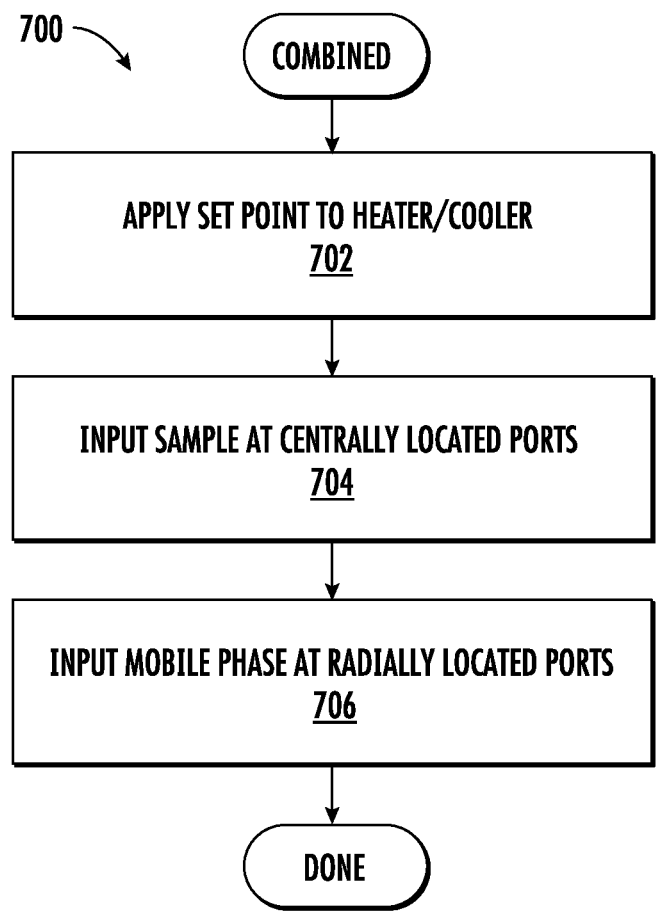
FIG. 7 depicts a flowchart of illustrative steps that may be performed to compensate for thermal gradients in an exemplary embodiment.

FIG. 7 depicts a flowchart 700 of illustrative steps that may be performed to combine the two approaches described herein for reducing thermal gradients. First, the temperature set point is set for the heater/cooler 602 to compensate for the frictional heating or Joule-Thomson cooling (702). Then, the sample of analyte is input via the central injector ports 605 (704). The solvent(s) of the mobile phase is/are input via the radially outward located injector ports 607 (706).

As shown in the chromatogram 800 of FIG. 8, the peaks 802, 804 and 806 are narrowed and do not suffer from tailing so they have well shaped peaks when these approaches are performed. Thus, these approaches help to compensate for problems originating from thermal gradients.

While the exemplary embodiments have been described herein, it will be appreciated that various changes in form and detail may be made without departing from the scope as defined in the appended claims.

The invention claimed is:

1. A chromatography system, comprising:
   a chromatography column having an inlet, an outlet and a stationary phase situated in the column;
   a mobile phase cooler situated before the inlet of the column for cooling a mobile phase before the mobile phase enters the chromatography column;
   a calculator for estimating an amount of heating of the mobile phase due to frictional heating that is expected as the mobile phase passes over the stationary phase from the inlet to the outlet;
   a controller configured to control the mobile phase cooler so that the mobile phase cooler cools the mobile phase to a target temperature that is colder than an ambient temperature surrounding the column to fully offset the estimated amount of heating that was estimated by the calculator, the target temperature being chosen as a difference between a current temperature of the mobile phase at the inlet and the estimated amount of heating.

2. The chromatography system of claim 1, further comprising an injector for injecting an analyte in a centrally located portion of the inlet but not in outer radial portions of the inlet.

3. The chromatography system of claim 2, wherein the injector is configured for injecting the mobile phase without the analyte in the outer radial portions of the inlet.

4. The chromatography system of claim 2, wherein the injector includes injector ports radially distributed across the inlet of the chromatography column.

5. The chromatography system of claim 1, wherein the mobile phase is one of a gas, a liquid or a fluid.

6. The chromatography system of claim 1, wherein the estimating is based on one or more of flow rate, viscosity of the mobile phase, heat capacity of the mobile phase and the chromatography column, current ambient temperature, temperature of the mobile phase prior to cooling, pressure delta or dimensions of the chromatography column.

7. The chromatography system of claim 1, wherein the chromatography column is not insulated.

8. The chromatography system of claim 1, further comprising insulation for insulating at least a portion of the chromatography column.

9. The chromatography system of claim 1, wherein the calculator is part of the controller.

10. The chromatography column of claim 1, wherein the calculator calculates a magnitude of axial heating of the mobile phase.

11. The chromatography column of claim 10, wherein the magnitude of axial heating is a difference between the temperature of the mobile phase at the outlet of the chromatography column and the temperature of the mobile phase at the inlet of the chromatography column.

12. The chromatography column of claim 1, wherein the estimated amount of heating is calculated by calculating a logarithmic function of volumetric flow rate of the mobile phase and pressure drop along the chromatography column.

13. The chromatography column of claim 12, wherein the logarithmic function is a natural logarithmic function of a product of the volumetric flow rate and the pressure drop.

* * * * *